United States Patent [19]

Schroder

[11] 3,942,330

[45] Mar. 9, 1976

[54] GAS DRYING APPARATUS AND METHOD

[76] Inventor: Lowell William Schroder, 2536 S. 39th, Lincoln, Nebr. 68506

[22] Filed: July 1, 1974

[21] Appl. No.: 484,404

[52] U.S. Cl. .............................. 62/5; 55/17; 55/80; 55/97; 55/268; 62/93
[51] Int. Cl. .............................................. F25b 9/02
[58] Field of Search ......... 55/80, 97, 268, 309, 312, 55/17; 62/5, 93

[56] References Cited
UNITED STATES PATENTS

| 2,643,944 | 6/1953 | Malir, Jr. | 55/309 |
| 2,741,899 | 4/1956 | Von Linde | 62/5 |
| 3,304,783 | 2/1967 | Quigley | 55/309 |
| 3,775,988 | 12/1973 | Fekete | 62/5 |
| 3,815,375 | 6/1974 | Inglis | 62/5 |
| 3,858,403 | 1/1975 | Dunn | 62/5 |

Primary Examiner—Bernard Nozick
Attorney, Agent, or Firm—Lowe, Kokjer, Kircher, Wharton & Bowman

[57] ABSTRACT

Method and apparatus for removing oil and water vapors from compressed gas wherein process gas is first passed through an oil filter and a portion of the gas is then fed to a vortex tube. The cold gas output from the vortex tube is delivered to a gas-to-gas heat exchanger to condense water vapor in the balance of the process gas not having been fed to the vortex tube.

6 Claims, 2 Drawing Figures

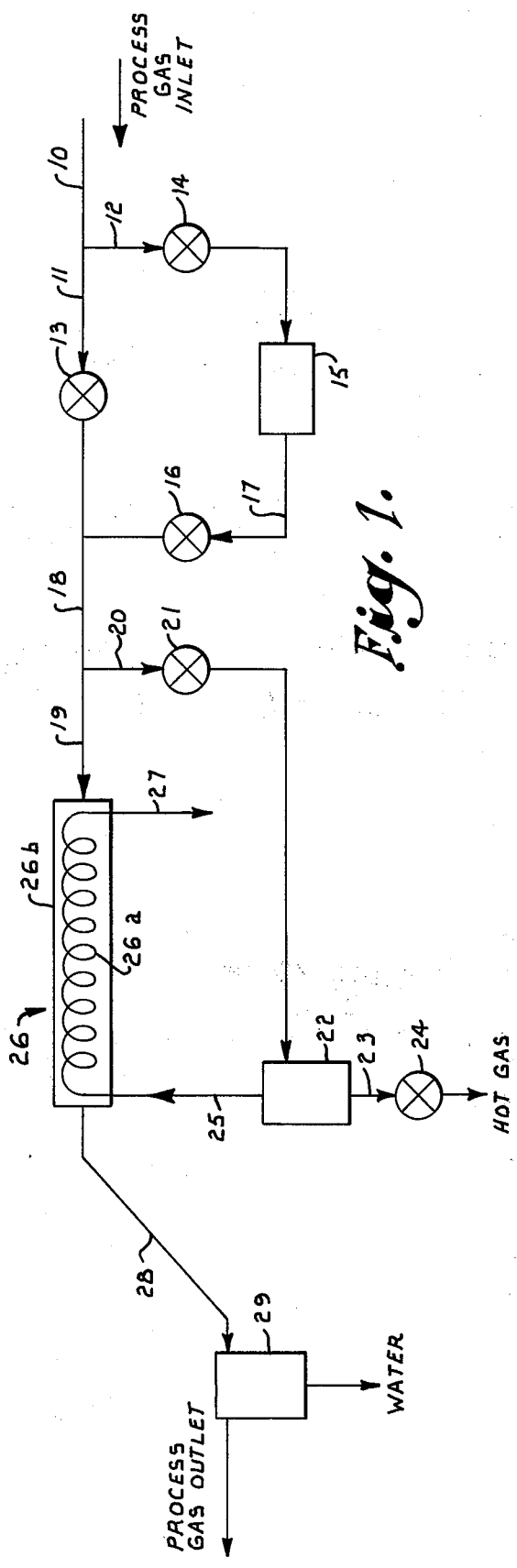
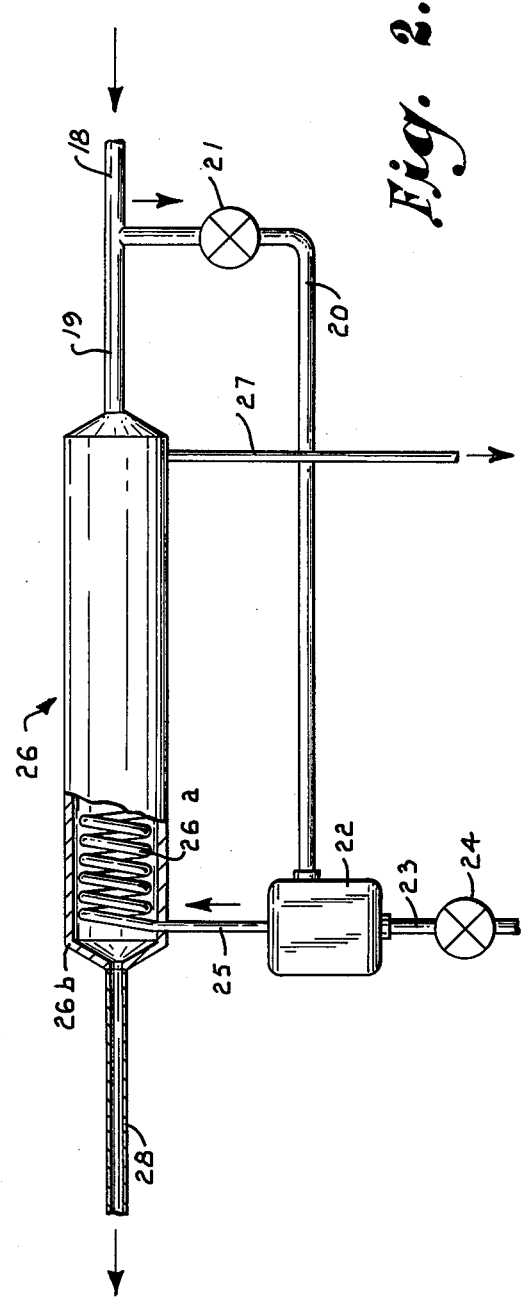

3,942,330

GAS DRYING APPARATUS AND METHOD

BACKGROUND AND SUMMARY OF THE INVENTION

This invention relates generally to the treatment of gases, and is particularly useful in the extraction of contaminants from compressed gas, such as oil and water vapors. More specifically, the invention relates to method and apparatus employing a filter for removing oil vapor from process gas and a vortex tube for producing a low temperature gas required for the condensation of water vapor in the process gas with a heat exchange relationship.

In the past, there have been dehumidification systems devised wherein a cooling process is used to condense the water vapor contained in a stream of compressed air or other gas. Most of these prior systems are characterized by a structural complexity that results in an unduly high production cost. Furthermore, the various cooling units utilized by existing systems typically require a substantial amount of external power in order to properly cool the gas, which leads to excessive operating and utility costs.

The present invention overcomes these and other disadvantages of the prior art systems by providing a structurally simple apparatus for drying gases and extracting oil vapor therefrom. Oil vapor in the process gas is first trapped in a filter and the gas is then split into primary and secondary streams. A vortex tube operates without an external power source to lower the temperature of a portion of the secondary stream which is then passed through a heat exchanger to cool the primary stream and condense water vapor therefrom.

An object of this invention is to provide a method and apparatus for removing oil and water vapors from compressed gas.

Another object of the invention is to provide a cooling unit having no moving parts for condensing the water vapor contained in a process gas.

Yet another object of the invention is to provide gas drying apparatus wherein the energy of a portion of the inlet gas is utilized to produce the low temperature required for water condensation, thereby eliminating the need for an external power source.

A further object of the invention is to provide gas drying apparatus of a simple and reliable construction to function economically to remove water and oil from process gas with minimal maintenance and repair.

Other and further objects of the invention, together with the features of novelty appurtenant thereto, will appear in the course of the following description.

DETAILED DESCRIPTION OF THE INVENTION

In the accompanying drawing, which forms a part of the specification and is to be read in conjunction therewith, and in which like reference numerals are utilized to indicate like parts in the various views:

FIG. 1 is a schematic process flow diagram of an oil and water extraction system employing a preferred embodiment of the invention; and FIG. 2 is a fragmentary, partially sectional view of the cooling unit employed in the gas drying section of the system.

The method of the invention employed to remove oil and water vapors from a compressed gas will be apparent with reference to the schematic flow diagram of FIG. 1 illustrating the process. Generally, the process includes, when conditions require the removal of oil vapors, passing the compressed gas through an oil filtering section of the system. Thereafter, the process gas is divided and a portion is fed through a vortex tube where the cool gas discharge is employed in a heat exchange relationship with the balance of the process gas to condense water vapor therefrom.

Referring now to the drawing in greater detail, compressed gas is fed to the processing units through inlet line 10 which branches into lines 11 and 12. Line 11 is an oil filter by-pass line and includes a valve 13 therein. Line 12 includes a valve 14 and leads to an oil filter unit 15. A valve 16 is disposed in the discharge line 17 from the filter unit 15 and line 17 joins the by-pass line 11 to form a common line 18.

The filter 15 is preferably a conventional element-type filter employing tissue paper or like material which extracts and absorbs oil vapor from the gas flowing therethrough. Although the illustration of FIG. 1 includes only one filter 15, it should be noted that any desired level of efficiency of oil vapor extraction may be obtained by employing a plurality of similar filters connected in a series or parallel arrangement, or a combination series and parallel arrangement.

The line 18 is divided to form a heat exchanger influent line 19 and a side stream line 20 which includes a valve 21 and is connected to a vortex tube 22. Vortex tube 22 is a conventional and commercially available processing device for obtaining from a pressurized gas two gas streams at different temperatures. As described in U.S. Pat. No. 1,952,281, issued Mar. 27, 1934, to Ranque, the vortex tube includes a chamber having the shape of a surface of revolution, such as a cylinder. An inlet conduit tangentially introduces the gas into this chamber and a gyratory motion is thereby imparted to the inlet gas. The vortex tube includes a means for dividing the gas into two concentric sheets moving along one another so that the outer sheet is compressed by the inner sheet and by centrifugal force exerted thereupon. The work thus produced causes a substantial rise in the temperature of the outer sheet (which exits as a hot gas discharge) and a corresponding drop in the temperature of the inner sheet (which exits as a cold gas discharge).

Accordingly, in the vortex tube 22 shown in the drawing, a hot gas effluent line 23 equipped with a valve 24 exits the vortex tube 22 for discharging hot gas generated in vortex tube 22 to the atmosphere or to further processing such as heat recovery units in manners well known to those skilled in the art. The cold gas effluent line 25 from the vortex tube 22 is connected to the coils 26a disposed within shell 26b of heat exchanger 26. At the opposite end of the exchanger 26, coils 26a are connected to an exit line 27 which extends through the shell 26b.

It should be noted that any conventional gas-to-gas heat exchanger may be employed for use with the invention. And, although a counter current heat exchange relationship is illustrated, co-current heat exchange and other heat exchange techniques known in the art may be satisfactorily utilized herein.

Heat exchange influent line 19 is connected to the shell 26b at one end thereof. At the opposite end is connected effluent line 28 which may be equipped with a water collector or trap 29 to receive condensate water from the process gas. Alternatively, a drain may be installed in the bottom of the heat exchange shell 26b in order to discharge the condensate. Wherever located, the trap 29 may be either of the manual or automatic draining type.

In operation, the valve 13 is normally closed and the valves 14 and 16 are open. As incoming gas passes through filter 15 (or a plurality of similar filters) the oil vapor contained therein is absorbed by the filter element. Of course, if it is not desired to remove oil vapor from the gas, filter 15 may be by-passed by closing valves 14 and 16 and opening valve 13.

The filtered gas then flows through line 18 where the flow is split into two streams with flow control regulated by valve 21. The primary stream is carried by line 19 to the heat exchange 26 and the secondary stream is carried by line 20 to the vortex tube 22. Hot gas generated in the vortex tube 22 discharges through line 23 and the cold gas generated passes through line 25 to cooling coils 26a and then out discharge line 27. The primary stream of process gas, that in line 19, encounters cooling coil 26a as it flows through heat exchange shell 26b. As the gas temperature is thus lowered to near 0°C by circulation about the coil 26a, the moisture in the process gas condenses and is removed from the system through a drain such as water trap 29. The process gas, having been processed according to the goals of the invention, is then discharged from the system.

From the foregoing it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A process for removing water vapor from a compressed gas stream, the steps of said process comprising:
dividing said gas stream into first and second streams;
generating a cold gas stream and a hot gas stream by directly passing said first stream, without intermediate heat exchange, through a vortex tube separator;
cooling said second stream by passing same in heat exchange relationship with said cold gas stream to cause the temperature lowering of said second stream and the condensation of water vapor therefrom; and
separating the condensate from said second stream.

2. The process as in claim 1 including the step of filtering oil vapor from said compressed gas prior to said first named step.

3. The process as in claim 1 wherein said last named step comprises collecting said condensate, and removing the collected condensate from contact with said second stream.

4. Apparatus for removing water vapor from a compressed gas stream, said apparatus comprising:
flow dividing means receiving and splitting said gas stream into first and second streams;
a vortex tube separator connected to said flow dividing means at a first portion to receive said first stream therefrom and to generate a cold gas stream and a hot gas stream; and
a gas-to-gas heat exchanger connected to said flow dividing means at a second portion to receive said second stream therefrom and to said vortex tube separator to receive said cold gas stream therefrom whereby said second stream is cooled in heat exchange relationship with said cold gas stream to cause the temperature lowering of said second stream and the condensation of water vapor therefrom and means separating the condensed water vapor from the second stream connected to said heat exchanger.

5. Apparatus as in claim 4 including oil filter means connected to said flow dividing means to remove oil vapor from said gas stream prior to introduction to said flow dividing means.

6. Apparatus as in claim 4 including water collection means connected to said heat exchanger to remove condensate from said second stream.

* * * * *